March 16, 1943.   R. L. MALLORY   2,314,152
CONTROL INSTRUMENT
Filed March 30, 1940   2 Sheets-Sheet 1

INVENTOR.
ROBERT L. MALLORY
BY C.B. Spangenburg
ATTORNEY

March 16, 1943.                R. L. MALLORY                    2,314,152
                              CONTROL INSTRUMENT
                            Filed March 30, 1940              2 Sheets-Sheet 2

INVENTOR
ROBERT L. MALLORY
BY C. B. Spangenberg
ATTORNEY

Patented Mar. 16, 1943

2,314,152

UNITED STATES PATENT OFFICE 2,314,152

CONTROL INSTRUMENT

Robert L. Mallory, Houston, Tex., assignor to The Brown Instrument Company, Philadelphia, Pa., a corporation of Pennsylvania Application March 30, 1940, Serial No. 326,923

9 Claims. (Cl. 137—153)

The present invention relates to flow control instruments and more particularly to instruments for measuring and controlling the ratio of the flow of fluid through a plurality of pipes.

It is an object of my invention to provide an instrument which may be used to determine and control the ratio of the flow of a fluid through one conduit with respect to the flow through another. It is a further object of my invention to provide an instrument that is adapted to control a second instrument through various portions of a total range for a given movement of the first instrument.

It is a further and more specific object of my invention to provide a remotely actuated and adjustable pneumatic unit to be used in a control instrument. This unit is so designed that for a given pressure applied to it a lever may be moved varying amounts, depending upon the adjustment of the unit.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
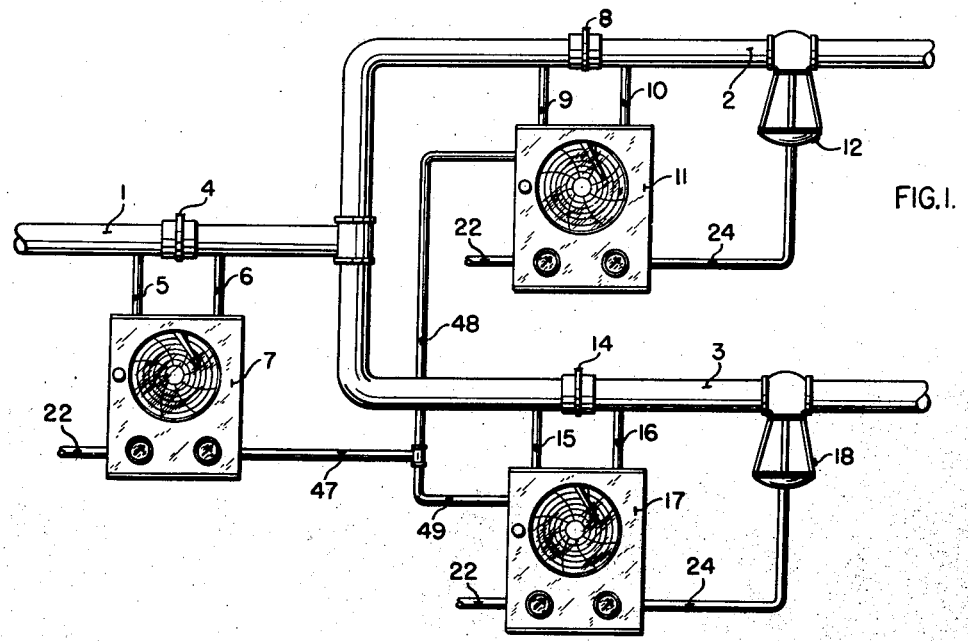
Fig. 1 is a diagrammatic representation of a flow control system using an instrument of my invention.

There is shown in Figure 1 a pipe 1 through which a fluid is flowing into branch pipes 2 and 3. If, for example, this fluid is a liquid that is being supplied through pipes 2 and 3 to suitable storage or treatment tanks, it may be desired under some conditions to have one tank supplied with a certain percentage of the fluid and under other conditions with a different percentage. In order to accomplish this a flow control instrument is placed in each of the pipe lines 2 and 3 and these instruments are proportionately adjusted by a third instrument that is used to measure the total flow through pipe 1. To this end there is an orifice member 4 in the pipe 1, from the opposite sides of which are taken pressure taps 5 and 6 to a flow measuring and control instrument 7.

There is located in pipe 2 an orifice member 8 from opposite sides of which are taken pressure taps 9 and 10 that lead to a flow measuring and control instrument 11 which is used to adjust a valve 12 in the pipe 2. This valve is shown as being an air operated valve in which air pressure applied to a diaphragm thereof is used to close the valve. In a similar manner the pipe 3 is provided with an orifice 14 from opposite sides of which pressure taps 15 and 16 lead to a control instrument 17 that operates to change the pressure applied to and therefore the opening of a valve 18 in the pipe 3. This valve is similar in operation to valve 13, namely, an increase in pressure applied thereto causes the valve to close.

Figure 2:
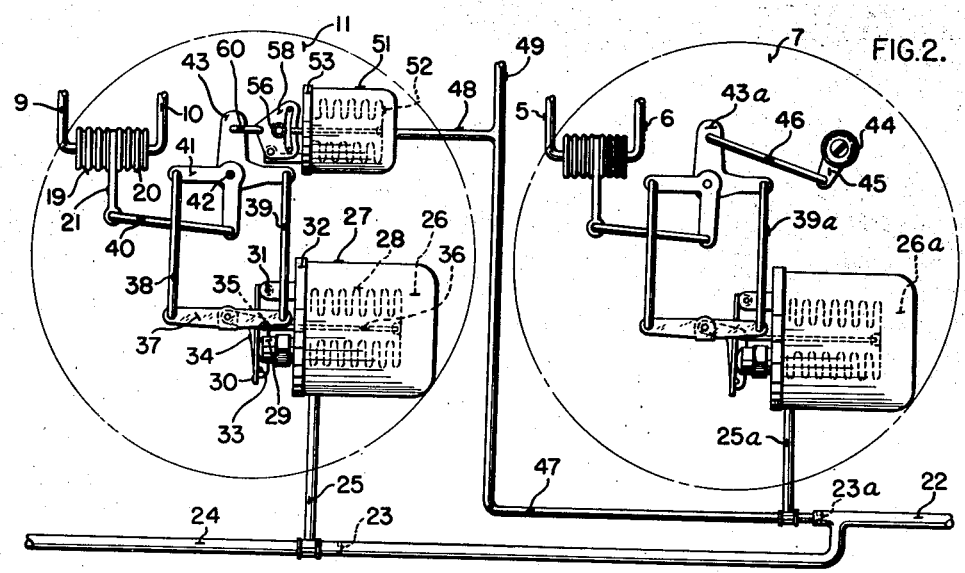
Fig. 2 is a diagrammatic view showing the manner in which one instrument adjusts the control point of the other.

Apparatus by which a change in flow in pipe 2 produces a change in the opening of valve 12 is shown in Figure 2. The pressure pipes 9 and 10 extend into the instrument 11 and are connected, respectively, to the interior of bellows 19 and 20, at the stationary ends of the latter. As the flow in pipe 2 changes, the pressure in the bellows will change and cause their free ends to move a plate 21 attached thereto. The movement of this plate produces a pressure change in a controlled air system to vary the opening of valve 12. Air is supplied under constant pressure through an air line 22 past a restriction 23 to pipes 24 and 25. The former leads to valve 12 while the latter leads to chamber 26 formed between a cup-shaped housing 27 and a bellows 28. The chamber is provided with a leak nozzle 29 that is slightly larger than the restriction 23. Therefore, as a flapper valve 30 is moved toward the nozzle 29 to throttle the flow therethrough pressure will be built up in chamber 26 and pipes 24 and 25 while if the flapper is moved away from the nozzle air can escape faster than it can enter past the restriction 23 with a consequent reduction of pressure in the chamber and pipes.

The flapper valve 30 is pivoted at 31 on a support extending from a plate 32 to which housing 27 and bellows 28 are also attached. Flapper 30 is biased toward the nozzle 29 and is moved away therefrom by a pin 33 on the end of one arm of a lever 34 that is pivoted at 35 on link 36 whose other end is attached to the end wall of bellows 28. The second arm of lever 34 is pivoted to the mid-point of a lever 27 that is supported by the lower ends of lyinks 38 and 39. Link 38 is moved downwardly so that flapper 30 can approach nozzle 29 in response to an increase in the flow through pipe 2 means of the plate 21 acting through a link 40 to rotate lever 41 around its pivot 42.

In operation an increase in flow in the pipe 2 will increase the pressure in bellows 19 causing the plate 21 to move to the right. This, through the above described lever system permits flapper 30 to move toward nozzle 29 to throttle the flow therethrough and build up pressure in chamber 26 and pipes 24 and 25. The increased pressure in pipe 24 causes valve 12 to close to bring the flow in pipe 2 back to normal and the increased pressure in chamber 26 produces a follow-up movement to prevent over adjustment of the valve. As the pressure in chamber 26 increases the bellows 28 will be collapsed moving the link 36 to the left to shift lever 34 to the left so that pin 33 may partially remove the flapper from the nozzle. The control point of the instrument, or the point at which the instrument tends to maintain the flow, may be changed by axially adjusting the link 39. This is done by rotating an angular lever 43, also pivoted at 42, by any suitable means, but preferably by apparatus to be described below.

The instrument 17 is similar to that just described and the instrument 7 differs therefrom only in the manner in which the control point is varied. That instrument is shown in Figure 2 as having the control point manually adjusted by means of a knob 44 to which is attached a crank 45. The crank is connected to lever 43a, corresponding to lever 43, by means of a link 46. Therefore, as the knob 44 is rotated the link 39a will be raised or lowered to raise or lower the control point of the instrument.

The instrument 7 is supplied with air from the line 22 past a restriction 23a to pipe 25a and chamber 26a. Instead of having a pipe comparable to the pipe 24 leading to a valve, the pressure changes produced by this instrument are applied through pipes 47 and 48 to the mechanism for changing the control point of the instrument 11 and through pipes 47 and 49 to a similar mechanism for changing the control point of instrument 17.

Figure 3:
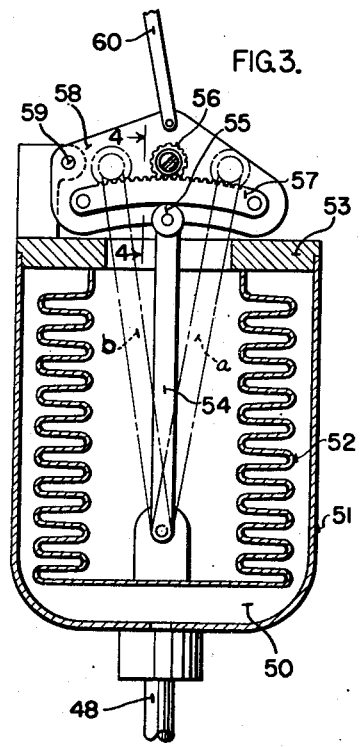
Fig. 3 is a sectional view of one adjusting unit.

One form of this mechanism is shown on an enlarged scale in Figure 3, in which it may be seen that the pipe 48 communicates with an expansible chamber 50 formed between a cup-shaped casing 51 and a bellows 52, each of which is attached at its open end to a supporting plate 53. Pivotally fastened to the inner end wall of the bellows 52 is a connecting link 54 which has a roller 55 fastened near its upper end and which has frictionally mounted on its upper end a pinion 56. Received between the lower edge of the pinion and roller 55 is an arcuate shaped rack member 57, the teeth of which are engaged with the teeth of the pinion 56. The rack is attached to a plate 58, pivoted at 59 on an extension from plate 53, and is connected by a link 60 to one arm of the lever 43.

By means of the above mechanism it will be seen that a change in pressure applied by instrument 7 to pipe 48 will cause lever 43 and lever 43a of instruments 11 and 17 to simultaneously be shifted to vary the control points of these instruments. By changing the distance between pivot 59 and the pinion 56, the link 60 may be shifted various amounts for the same pressure change in chamber 50. For example, if the pinion 56 is rotated to bring link 54 to dotted position a, the link 60 will not be moved as much as it would be if the link 54 was in dotted position b. It is noted that a spring 61 acts to hold the pinion 60 against link 54 with sufficient force to prevent accidental displacement thereof.

In the operation of the system the instrument 7 will measure the flow through the pipe 1 and will set up in the pipe 47 a pressure proportional thereto. This pressure will be applied through pipes 48 and 49 to change the control points of instruments 11 and 17 accordingly. By adjusting the lever 54 in the instruments 11 and 17 different distances from the center 59 around which member 58 moves, the two instruments can have their control points adjusted in accordance with some predetermined ratio. Therefore, the system may be set up so that the lever 58 in instrument 11 is moved three times as much as lever 58 in instrument 17 with a proportionate adjustment of valves 12 and 18 to keep a predetermined ratio between the flow in pipes 2 and 3. This ratio will then be maintained for any flow through the pipe 1.

Figure 6:
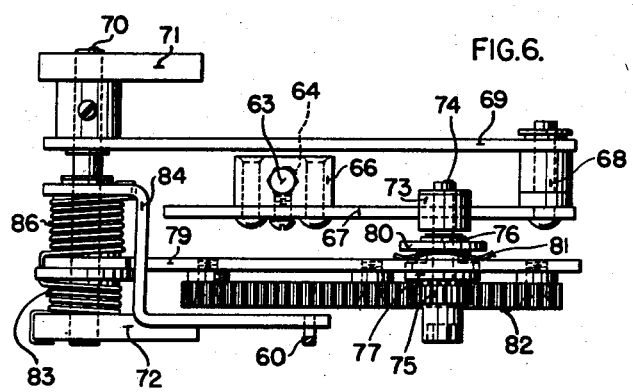
Fig. 6 is a plan view of the levers of Figure 5.
Figure 4:
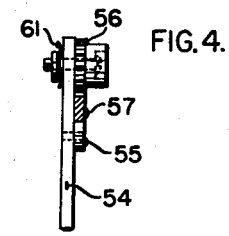
Fig. 4 is a view on line 4—4 of Figure 3.
Figure 5:
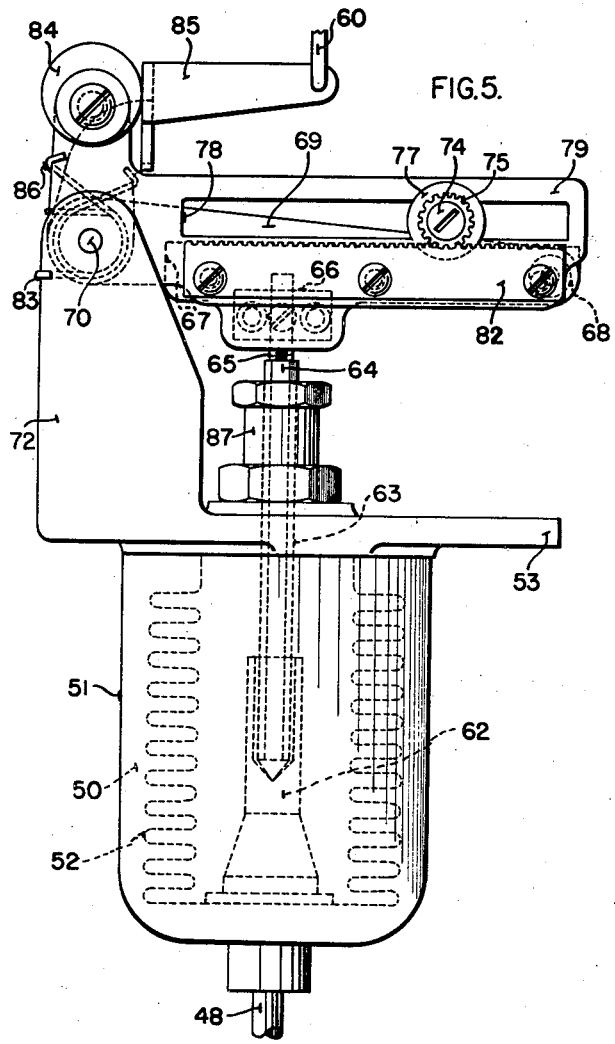
Fig. 5 is an elevation of another form thereof.

There is shown in Figures 5 and 6 an embodiment of the control point adjusting mechanism that may be used in place of that disclosed in Figures 3 and 4, and differs from the latter in the manner in which the ratio adjustments are made. In this embodiment the bellows 52 has a socket member 62 attached to its end wall. This socket receives a rod 63 whose upper end is provided with a hexagonal enlargement 64 and is screw-threaded as shown at 65. The enlargement 64 normally rests on and its downward movement is limited by an adjustable abutment 87. The upper end of rod 63 is screwed into a block 66 attached to a lever 67 pivoted at 68 on the outer end of a guiding and supporting lever 69 that is in turn pivoted on a shaft 70 which is journalled in lugs 71 and 72 extending up from plate 53. As the bellows 52 changes in length due to pressure changes in chamber 50 the rod 53 will move the two levers 67 and 69 around their respective pivots.

Bearing against the upper surface of the lever 67 is a roller 73 on a shaft 74 that has a pinion 75 on its other end. Surrounding and attached to the shaft 74 is a sleeve 76 having an enlarged head 77. This sleeve extends through a slot 78 in a lever 79, that is also pivoted around shaft 70 with its head 77 engaging one side of the lever. Fastened to the other end of the sleeve is a washer 80 between which and its side of lever 79 is a spring 81. The spring 81 serves to frictionally force head 77 against the side of lever 79 to prevent accidental movement of the shaft 74 relative to the lever. The pinion 75 is in mesh with a rack 82 that is attached to the side of lever 79. By rotating the pinion the shaft 74 may be smoothly and accurately positioned along the lever 79 to change the position of roller 73 on lever 67. This arrangement permits an adjustment of the amount of movement imparted to the lever 79 for a given pressure change in chamber 50 since the ratio of levers 67 and 79 is changed. A spring 83 is provided to continuously force the lever 79 in clockwise direction in Figure 5 so that the roller 73 is maintained in engagement with the edge of lever 67 at all times.

Movement is imparted to the link 60 by lever 79 by means of the engagement between an eccentric roller 84 attached to an upstanding portion of lever 79 and a lever 85 that is free on the shaft 70. Lever 85 is kept in engagement with the eccentric 84 by a spring 86. This spring also serves as an over-travel release since if the link 60, attached to lever 85, has moved to the end of its path of travel the lever 85 may remain stationary and the spring 86 will give permitting the eccentric to move relative to the lever. By rotating the eccentric 84 the relative positions of link 60 and lever 79 may be adjusted for the purpose of accurately positioning the control point of the instrument 11 or 17 relative to the other.

From the above it will be seen that I have invented an apparatus whereby the ratio of the flows of a fluid through a plurality of pipes may be kept constant for any value of the flow. My improved instrument may be used in other applications than that disclosed since it is readily adapted for use wherever one part is to be remotely adjusted in proportion to the adjusting movements of another.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a control instrument, a measuring element, a control means operated thereby, control point adjusting means for said control means to adjust the value at which said instrument will maintain a condition and a pneumatic unit to adjust said control point adjusting means comprising a pressure responsive member operated independently of the control means, levers operated thereby and means to change the response of said levers for a given movement of said pressure responsive member.

2. In a control instrument, a measuring element, control means operated thereby, control point adjusting means for said control means to adjust the value at which said instrument will maintain a condition including a lever system, a pressure responsive device operated independently of the control means to operate said lever system and means to change the amount of movement of said lever system for a given movement of said pressure responsive means comprising an element to adjust the ratio of movement of two levers of said lever system.

3. In combination, an air control instrument having a leak port and a valve therefor, means to adjust said valve relative to said port in response to variations in a control condition from a predetermined value, a second means to adjust said valve relative to said bleed port independently of said first means whereby the control instrument will tend to maintain the condition at a different predetermined value, said second means including a pressure responsive unit, an adjustable lever mechanism between the pressure responsive unit and the flapper, and a second air control instrument to vary pressure applied to said pressure responsive unit.

4. In combination, a pair of air control instruments, each of said instruments comprising an element movable in response to variations in a measurable condition, a source of pressure fluid for each of said instruments, means operated by movement of said elements of said instruments to vary the pressure of each supply of fluid respectively, means operated by the fluid pressure supply from one instrument to adjust the value of the condition being measured thereby, control point adjusting means for the last mentioned instrument, and means operable by the fluid pressure supply from the second instrument to adjust said control point adjusting means and including a pressure responsive device, an adjustable lever system, and connections between the pressure responsive device, said lever system and said control point adjusting means.

5. In combination, an air control instrument including a bleed port and a valve therefor, a supply of fluid under pressure adjusted to a value proportional to the relative positions of said valve and port, an element movable in response to variations in the value of a measurable condition, means actuated by said element to adjust said valve relative to said nozzle, second means to adjust said valve relative to said nozzle comprising a pressure responsive unit, connecting means between said unit and valve, mechanism forming part of said last mentioned means to change the relation between said unit and valve whereby said valve will be moved different amounts for a given movement of said unit, a second air control instrument, a second supply of air under pressure adjusted by the last mentioned instrument, an element movable in response to the variations in a second measurable condition to adjust the pressure supply of said second instrument, and connecting means between said second pressure supply and said unit.

6. In combination, a supply of fluid under pressure, an air control instrument operative to adjust the pressure of said supply of fluid in accordance with changes in the value of a condition to be controlled, a control point adjusting unit for said instrument comprising a device movable in response to pressure changes applied thereto, a lever system operated thereby, and means to adjust said lever system whereby it will move various amounts for a given movement of said device, a second air control instrument, a second supply of fluid under pressure adjusted by said second instrument in response to variations in the value of a second variable condition, and means to apply said second variable pressure from the second instrument to said device.

7. In combination, a pressure responsive unit comprising a cup-shaped casing, a bellows extending into the same and forming with said casing an expansible chamber, the bellows elongating or contracting in response to pressure changes in said chamber, a pivoted lever, means to move said lever around its pivot by said bellows comprising a thrust rod actuated by said bellows and operating to move said lever, adjustable means to vary the amount of movement imparted to said lever by said thrust rod for a given pressure change in said chamber, a first control instrument, control point adjusting means therefor, means to operate said control point adjusting means by said lever, a second control instrument, a supply of air under pressure for said chamber, and means operated by said second control instrument to regulate the pressure of said supply of air.

8. In a pneumatic instrument having means to set up an air pressure in proportion to the value of a condition to be controlled and having means to adjust the value at which said condition is to be maintained, said last means including an expansible chamber having a movable wall, a first pivoted lever, means to move said lever around its pivot by movement of said wall, a second pivoted lever having a slot therein, a rack member attached to said lever adjacent said slot, a pinion cooperating with said rack member, a shaft for said pinion extending through said slot, means acting on said shaft to hold said pinion and shaft at some given position along said rack, and means to move said second lever by said first lever comprising a member on said shaft lying in the path of movement of said first lever.

9. In an air control instrument, means to set up an air pressure proportional to the value of a condition to be controlled, means to vary the value at which said condition is to be controlled and therefore the normal value of said pressure comprising an expansible chamber having a movable wall, a pivoted lever, a part moved by said wall, a thrust member on said part, means to adjust said thrust member comprising a rack and a pinion to which said thrust member is attached, rotation of said pinion moving the same along said rack to various adjusted positions, means to normally maintain said pinion in its adjusted position, said thrust member acting on said lever, and connecting means between said lever and control point adjusting means.

ROBERT L. MALLORY.